United States Patent [19]

Williams

[11] 4,301,774
[45] Nov. 24, 1981

[54] GUNPOWDER FUELED INTERNAL COMBUSTION ENGINE

[76] Inventor: Samuel D. Williams, 127 W. 82nd St., Apt. 3A, New York, N.Y. 10024

[21] Appl. No.: 84,903

[22] Filed: Oct. 15, 1979

[51] Int. Cl.³ .............................................. F02B 45/06
[52] U.S. Cl. .................... 123/23; 123/24 R; 123/58 R
[58] Field of Search ............... 123/23, 24, 52 A, 41.01, 123/58 R

[56] References Cited

U.S. PATENT DOCUMENTS

| | | | |
|---|---|---|---|
| 79,938 | 7/1868 | Babbitt | 123/24 |
| 485,989 | 11/1892 | Sheffield | 123/24 |
| 1,945,727 | 2/1934 | Braunwalder | 123/58 R |
| 2,396,524 | 3/1946 | Nettel | 123/23 |
| 3,726,262 | 4/1973 | Moon | 123/41.01 |
| 4,077,367 | 3/1978 | Steiger | 123/23 |

FOREIGN PATENT DOCUMENTS 982048  4/1902  France ............................. 123/58 R Primary Examiner—Craig R. Feinberg
Attorney, Agent, or Firm—Richard L. Miller

[57] ABSTRACT

A gunpowder fueled internal combustion engine having a cylinder block with a plurality of cylinders circularly arranged in the cylinder block.

An upper housing is located on the cylinder block in which is contained a storage chamber for storing the gunpowder. An air intake system is also provided in the upper housing. A metering system is included for sequentially directing controlled amounts of gunpowder and air from the upper housing to each cylinder where the gunpowder and air mixture can be burned within the cylinder. A crank shaft arrangement is provided in the cylinder block. Pistons reciprocatingly associated with each cylinder drive the crank shaft system.

4 Claims, 10 Drawing Figures

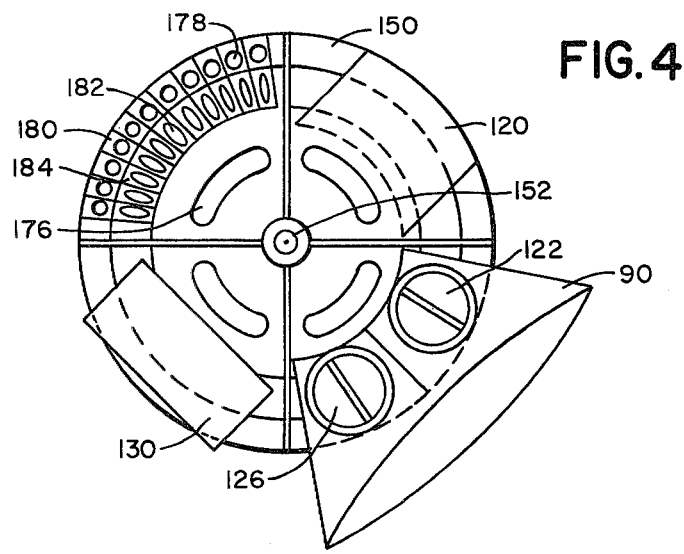
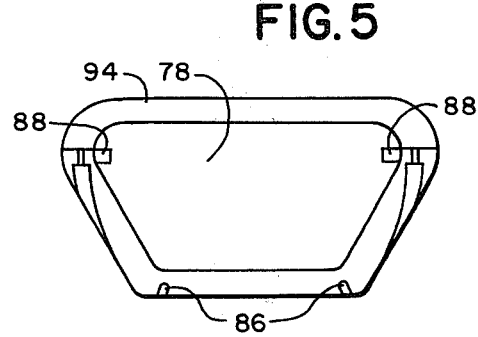
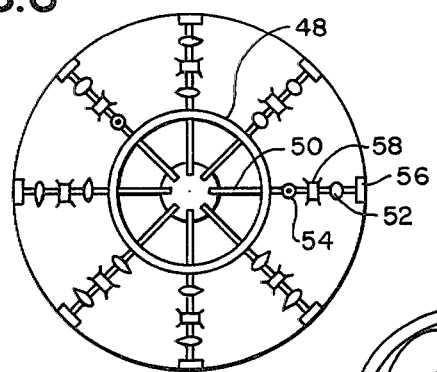
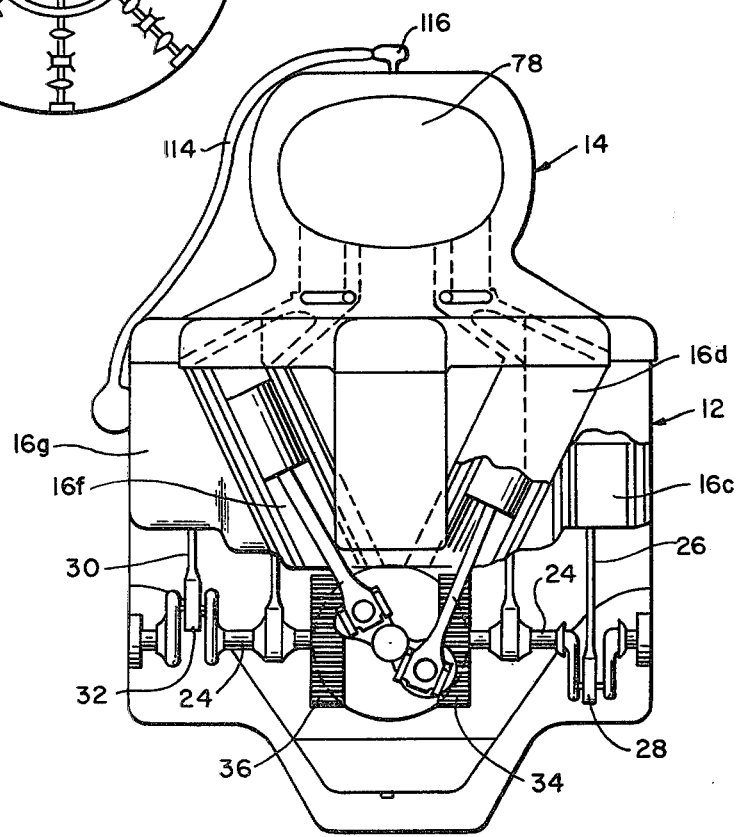

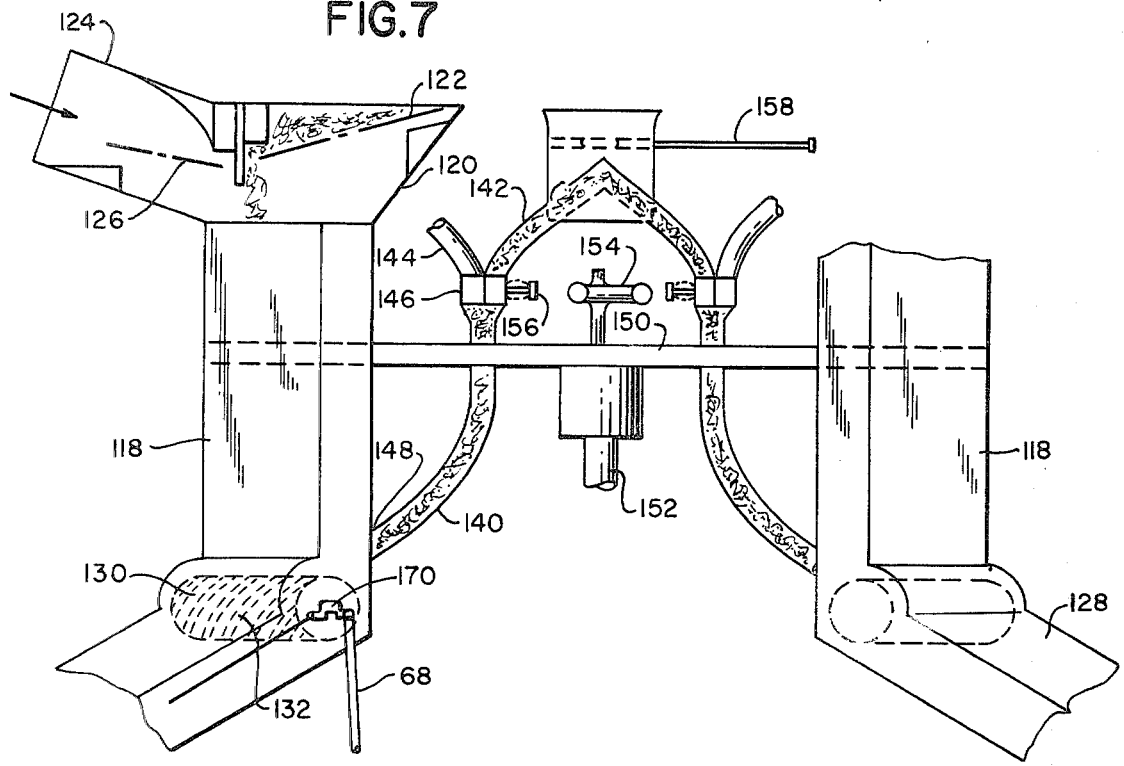
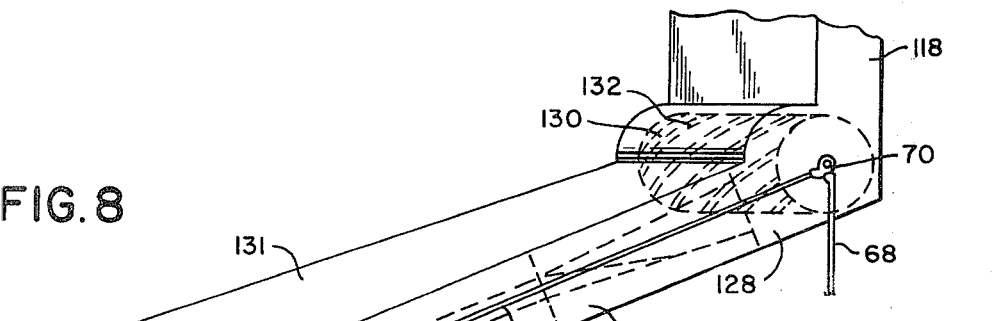
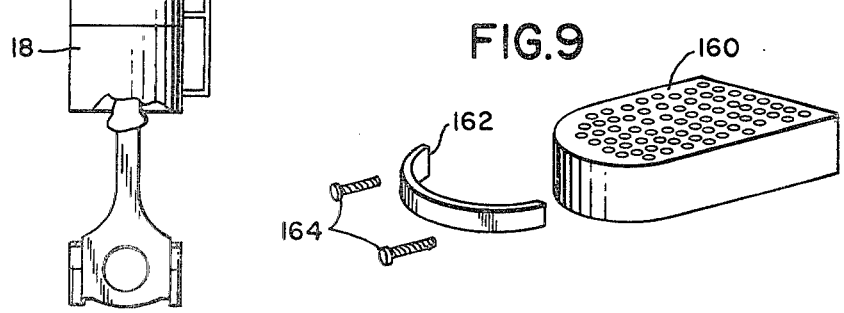
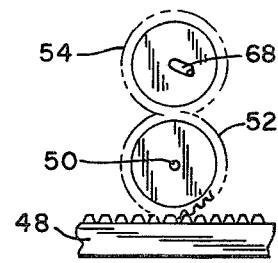

GUNPOWDER FUELED INTERNAL COMBUSTION ENGINE

BACKGROUND OF THE INVENTION

This invention relates to internal combustion engines, and more particularly to a gunpowder fueled internal combustion engine.

An internal combustion engine produces power by burning fuel inside a closed cylinder. The hot gases from the burned mixture drive a piston or a rotor which turns a crank shaft to provide the output drive from the engine. The fuel which is typically utilized for internal combustion engines is gasoline, diesel, or similar related liquid fuels. While such engines have been consistently utilized, especially in the driving of automobiles and other vehicles, because of the increased cost and shortage of such liquid fuel, alternate sources of fuels are needed to drive such internal combustion engines.

At the same time, the fuel which is utilized for the internal combustion engine must be one that will be readily available and at the same time will produce sufficient power to drive the vehicle. It must also be controllable and able to be stored within the moving vehicle.

For many years, black powder has been utilized as an explosive for guns and other such explosive devices. Occasionally, black powder has also been utilized as an industrial explosive. However, such use has generally been limited. It has well been known that the black powder ignites easily and produces a hot, solid combustion product. The manufacture of such black powder is well known and is widely produced for explosive devices including fireworks, safety fuses, cannon propellents in guns, and other similar uses. The black powder ignites when heated, is readily lighted by small sparks or flames, and burns rapidly and at an increasing rate as the pressure increases.

While black powder, hereinafter generally referred to as gunpowder, has been readily available as an explosive, it has not heretofore been utilized as a fuel in conjunction with an internal combustion engine.

SUMMARY OF THE INVENTION

It is accordingly an object of the present invention to provide a gunpowder fueled internal combustion engine.

Another object of the present invention is to provide an internal combustion engine fueled by gunpowder wherein the gunpowder is stored in an upper housing positioned over a cylinder block.

Yet another object of the present invention is to provide an internal combustion engine fueled by gunpowder and having its cylinders circularly arranged about a center vertical axis of the cylinder block.

Yet a further object of the present invention is to provide an internal combustion engine fueled by gunpowder and having two perpendicularly arranged crank shafts.

Another object of the present invention is to provide an internal combustion engine fueled by gunpowder where the cylinders are liquid cooled.

Another object of the present invention is to provide an internal combustion engine fueled by gunpowder where the gunpowder is stored in a storage chamber and is fed into the cylinders by a modified carburetor arrangement utilizing fuel injection to achieve equal distribution of the gunpowder and air mixture to each cylinder.

Yet another object of the present invention is to provide an internal combustion engine fueled by gunpowder and utilizing a rotating wheel driven by the crank shaft which in turn operates a plurality of radially extending cam shafts as well as operating a rotating drum to drive the gunpowder to the cylinders.

A further object of the present invention is to provide an internal combustion engine fueled by gunpowder which includes silencer pads at the cylinder heads.

Yet a further object of the present invention is to provide an internal combustion engine fueled by gunpowder which brings in cold air for compression within each cylinder and utilizes the exhausted heated air to preheat the gunpowder stored in a storage chamber.

Briefly, in accordance with the present invention, there is provided a gunpowder fueled internal combustion engine which has a cylinder block with a plurality of cylinders arranged in the cylinder block. An upper housing is located on the cylinder block. Within the upper housing there is a storage chamber for storing the gunpowder. An air intake system is also located on the upper housing. A metering system is provided for sequentially directing controlled amounts of gunpowder and air from the upper housing to each cylinder. The gunpowder and air mixture can then be burned within the cylinders. In each cylinder there is provided a piston which can reciprocate therein and whose output is drivingly connected to a crank shaft located in the cylinder block.

In order to accommodate the use of the gunpowder as fuel for the internal combustion engine, numerous unique modifications are provided to the internal combustion engine which differ considerably from standard internal combustion engines. For example, the cylinders are circularly arranged about a vertical axis of the cylinder block with the cylinders positioned in an axial or angular direction. Two mutually perpendicular crank shafts are utilized. One pair of opposing cylinders have their pistons drivingly connected to a transverse crank shaft which in turn is utilized to drive a rotating wheel which operates the cam shafts. The longitudinal crank shaft is driven by all of the other cylinders and provides the driving force for the internal combustion engine. Silencer pads are placed at the cylinder heads.

The cam shafts are radially extending and further include eccentric cams controlling crank arms which operate rotating drums within distributing powder chutes. The power chutes receive the gunpowder from a storage chamber and by means of the rotating drum the gunpowder is fed to each cylinder. A fuel injection means is also provided and is driven by the same crank arm operating the rotating drums. A distribution system is provided to insure equal distribution of the gunpowder to each cylinder. The air intake system brings in cold air for use in the cylinders and the hot air exhausted from the cylinders is sent back to the storage chamber for preheating the gunpowder.

The foregoing objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 3 is an end view, with parts broken away;

FIG. 4 is a plan view of the inside of the upper housing, with parts broken away;

FIG. 5 is a side view of the upper housing, with parts broken away;

FIG. 6 is a schematic view of the cam shaft mechanism;

FIG. 7 is a diagramatic view of the gunpowder metering and transport system;

FIG. 8 is a diagramatic view of the lower end of the metering system and showing the discharge end;

FIG. 9 is a perspective view of the silencer disc; and

FIG. 10 is a schematic view of the gear mechanism used in conjunction with the cam shafts.

In the various figures of the drawing, like reference characters designate like parts.

DESCRIPTION OF THE PREFERRED EMBODIMENT

Figures 1, 2:
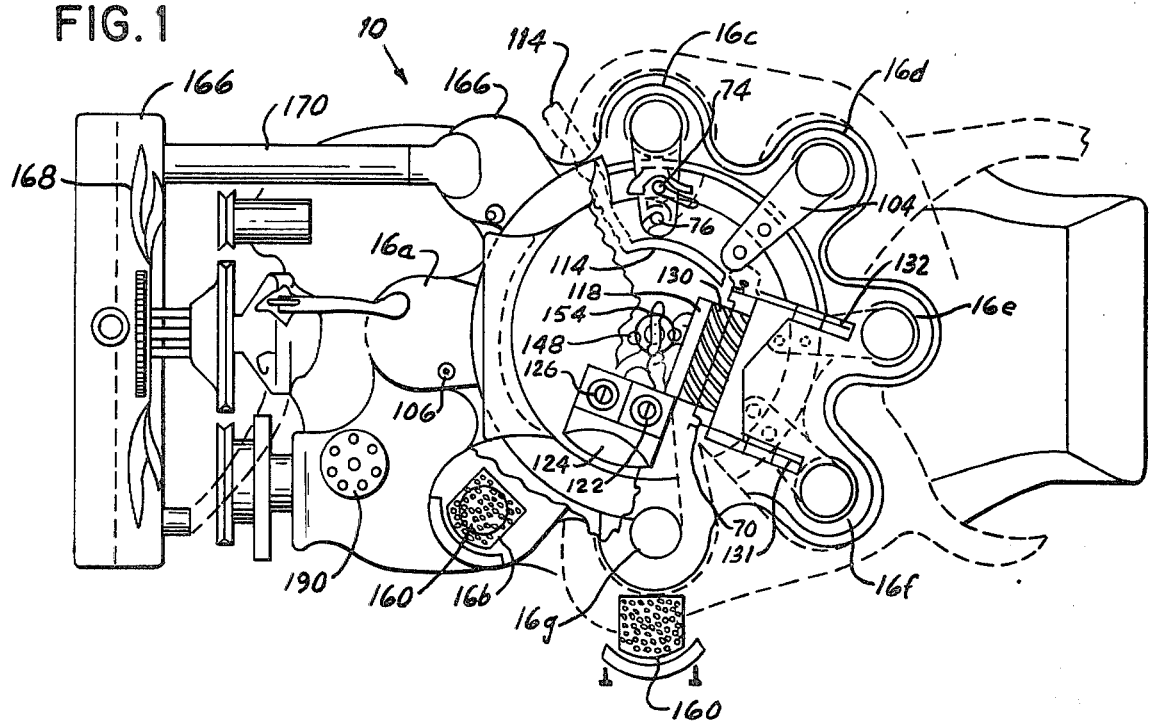
FIG. 1 is a plan view, partially broken away, of the gunpowder fueled internal combustion engine of the present invention.
FIG. 2 is an elevational view, with parts broken away and parts in section.

Referring now to the drawings, and particularly to FIGS. 1-3, the internal combustion engine of the present invention is shown generally at 10 and includes a cylinder block 12 with an upper housing 14 located above the cylinder block.

The cylinder block contains 8 cylinders listed as 16a-16h. The cylinders are circularly arranged about a central vertical axis passing through the cylinder block. Cylinders 16a and 16e lie along the longitudinal axis, while cylinders 16c and 16g lie along the transverse axis. These four cylinders are vertically positioned within the cylinder block. The other four cylinders 16b, 16d, 16f, and 16h, are angularly oriented toward the vertical axis as can best be seen in FIG. 3 which shows the angular disposition of cylinders 16d and 16f.

Located within each cylinder is a piston 18 with a piston rod 20 downwardly extending therefrom. A first crank shaft 22 is provided which extends along the longitudinal axis of the cylinder block. This can best be seen in FIG. 2. A second crank shaft, 24, is positioned perpendicular to the first crank shaft 22 and lies along a transverse axis. The pistons associated with the two cylinders 16c and 16g lying along the transverse axis are drivingly connected to the transverse crank shaft 24 as shown by the connection of the piston rod 26 extending from the cylinder 16c to the crank arm 28 as well the piston rod 30 extending from the cylinder 16g connected to the crank arm 32. It will be noted that a gear 34 is connected to the right hand portion of the crank shaft 24 and a further gear 36 is connected to the left hand portion of the crank shaft 24.

The pistons associated with all of the other cylinders are connected to the main longitudinal crank shaft 22, as can best be seen in FIG. 2. A fly wheel 38 is coupled to the main crank shaft 22 for continually rotating the main crank shaft 22 to drive the vehicle by means of the output from the crank shafts 22 and 24.

Within the cylindrical block is provided a central housing 40 containing a base block 42 and a centrally located rotating block 44. Bearings 46 permit the central block 44 to rotate within the base block 42. The rotating block 44 is rotated by means of the gears 36, 34 from the transverse crank shaft 24.

With reference now to FIGS. 2, 6 and 10, the cam shaft arrangement will now be explained. Upwardly extending from the rotating block 44 is provided a circular rack 48 coaxial with the circular block 44. A plurality of cam shafts 50 radially extend from the center of the rotating block 44. The cam shafts are positioned like spokes in a wheel with each cam shaft being located under a corresponding cylinder. Located on each cam shaft are the cams 52, 54 with the cam 52 operating the exhaust valve of each cylinder and the cam 54 operating the intake valve of its respective cylinders. The cam shafts are supported by means of upwardly extending bearing blocks 56, 58 from the base block 42. Each of the cam shafts are journaled within an idler gear 52 driven by the rack 48 on the rotating block 44.

An operating gear 54 is driven by the idler gear 52. Journaled in the operating gears are the shafts 64 containing an eccentric cam 66. The cams 66 operate the connecting rod 68 whose upward end terminates in a crank arm 70 which operates parts of a metering system to be hereinafter described, for metering the gunpowder and air mixture into the cylinders. Spring loaded push rods 72 are operated by means of the cams on the cam shaft and extend upwardly to operate the valves 74, 76 which respectively control the exhaust valve and the intake valve of each cylinder. The gearing arrangement between the rack 48, the idler gear 52 and the operating gear 54 all provide the necessary timing relationship to properly control the stroke cycle of the engine whereby each cylinder's intake and exhaust valve opens at the proper time and wherein the proper amount of gunpowder and air mixture is metered into the cylinders at the appropriate time.

The upper housing 14 includes a storage chamber 78 wherein the gunpowder 80 is stored. The gunpowder is provided into the chamber by means of the vacuum pump 82 which draws the gunpowder through an inlet tube 84 from the main supply tank provided elsewhere in the vehicle. As can best be seen in FIGS. 2 and 5, the storage chamber is provided with switch controls 86 at the bottom portion of the storage chamber which operate the control pump 82 to be sure that at least a minimum supply of gunpowder is provided within the storage chamber. There is also provided a spring weight control 88 adjacent the upper portion of the storage chamber which serves as a safety control to be sure that there is not provided any excessive amount of gunpowder within the storage area.

Also provided on the upper housing is an air intake scoop 90 as is best seen in FIGS. 2 and 4. Cold air is sucked in through this scoop and passes through the cold air filter 92 for entrance into the upper housing. An air passage 94 is provided around the entire upper housing so that the air can circulate around the upper housing and keep the temperature around the housing at a lower level. The air sucked in passes through an air intake valve 96 and then through the air line 98 to the air intake manifold 100 provided in the cylinder block. The cold air can then be drawn into the cylinders through the intake valve 76 where it can be sent to the cylinder, as shown at 102 at the top of the cylinder 16a. Subsequently, the mixture of gunpowder and air will be sent into the cylinder head through the metering system to be hereinafter described. The mixture is then ignited by means of the spark plugs 106. After burning of the gunpowder mixture within the cylinder, the piston moves back up to exhaust the residue into the exhaust manifold 108 in the cylinder block. Some of the air from the cold air intake manifold 100 proceeds down to a hot exhaust air manifold 110 where it is heated up by the exhaust gases in the exhaust manifold 108. The hot air then passes upward through the hot air pipe 112 where it passes around the upper housing through the tube 114 and passes into the hot air intake 116 at the top of the housing so that it can enter into the storage chamber 78 storing the powder 80. In this way, the cold air entering is used for combustion purposes and for cooling the outside of the housing. At the same time, after it is heated, the hot air is then sent to the powder to preheat the powder prior to its combustion.

The metering system for supplying the gunpowder and air mixture to the cylinders will now be described and can best be understood with reference to FIGS. 1, 2, 4, 7 and 8. The metering system is a form of a modified carburetor and fuel injection system. The metering system includes a series of chutes 118 having a mouth at its upper end 120 in the shape of a funnel. A butterfly valve 122 which is the throttle valve connected to the pedal in the vehicle controls the amount of gunpowder which enters into the mouth 120 of the chutes. The chutes are peripherally located adjacent the lower portion of the storage chamber so that the powder contained in the storage chamber can fall into the mouth of the funnel. Each chute is used to feed two cylinders, as will hereinafter be explained.

Adjacent to each mouth of the chute is provided a separate inlet port 124 which is coupled to the cold air flowing around the inner housing. A butterfly valve 126 positioned in that inlet port 124 serves as a choke for regulating the amount of air which is sent into the chute for providing a suitable mixture of air and gunpowder to each cylinder.

The mixture of air and gunpowder initially proceeds downwardly through the first part of the chute. Each of the chutes then has an outward bend where it leads into the continued extending portion 128. Located at the intersection of the vertical and angular sections of the chutes is a drum 130 having an annular groove 132 formed in its outer periphery. The drum 130 is rotated by means of the crank arm 70 driven by means of the connecting rod 68 from the eccentric cam 66, as was heretofore described.

The angular portion of the chute 128 then splits into the bifurcated sections 131, 132 wherein each section feeds an appropriate cylinder. In each section of the bifurcated ends, there is provided a fuel injection means, best seen in FIG. 8. The fuel injection means 134 consists of a spring loaded piston-cylinder arrangement which is caused to reciprocate by means of the extension arm 136 operated by the same crank arm 70 which controls the rotation of the drum.

In this manner, the controlled amount of gunpowder which is set by the throttle butterfly valve 122 together with the air controlled by the choke butterfly valve 126, is sent down the chute 118 and is pushed along the tube by means of the rotating drum 130. It moves down each of the bifurcated tubes and is fuel injected into the cylinder by means of the piston ramming the fuel into the cylinder. The drum and injection means are controlled by the cam timing arrangement so that a particular cylinder receives its fuel supply at the proper time within its cycle so that it will fire and burn the fuel at its appropriate timing arrangement. The fuel is injected into each cylinder head.

Referring now to FIG. 7, the idler arrangement will be described. As is well understood, when the engine is idling, a minimum amount of fuel is still required in order to continue the engine operating. Since generally the throttle valve is closed, no fuel will be sent through the chutes. Accordingly, separate idler tubes are provided for this purpose. Specifically, the idler tube 140 is shown having two inlet ports 142 and 144. The inlet port 142 is set into the storage chamber to receive a supply of gunpowder. The inlet port 144 is connected to the air intake system and receives cold air through the scoop. The two inlet ports merge proximate the spring loaded valve 146 and proceeds to an outlet port 148 which connects into the chute at a point above the drum 130.

A rotating table 150 is connected to the rotating block 144 by means of a connecting rod 152 as can best be seen in FIG. 2. As the transverse crank shaft 24 causes the rotating block 44 to turn, the rotating table 150 will also turn. Supported on the rotating table and axially extending thereabove, is an S-shaped cam 154 whose shape can best be seen in FIG. 1. As the rotating table continues to rotate, the S-shaped cam will engage the control knobs 156 of the spring loaded valves 146 to thereby open the idler tubes permitting a supply of fuel and air mixture to the chute to continue operating the engine while it idles. The amount of idling fuel supplied can be controlled by means of the idle screw 158, as is best shown in FIG. 7.

Located at the top of each cylinder head is a silencer disc 160, best shown in FIG. 9. The silencer disc is mounted by means of the brace 162 held in place by means of the screws 164. The positioning of the silencer disc 160 is best seen in FIG. 1 which shows the mounting of the discs in connection with the cylinder 16g, and a silencer disc in place, as shown on cylinder 16h.

The engine is a water cooled engine with the water supplied from the radiator 166 cooled by means of the fan 168. The water is supplied to the engine by tube 170 and passes around each of the cylinders, as shown at 172. The water then returns through the tube 174 back to the radiator.

Referring now to FIG. 4, the arrangement of the rotating table 150 will be described. The table is rotated by means of the drive rod 152 connected from the rotating block 44 driven by the crank shaft. The positioning of the funnel 120 of the powder chute is schematically shown as is shown the drum 130 which moves the powder along the chutes. The openings 176 are provided for the idler tubes. The butterfly valves forming the throttle and the choke, 122 and 126 are also shown.

Since each chute feeds two cylinders, it is necessary to provide an equal amount of fuel to each of the two cylinders. This is achieved by means of the unique feed port arrangement. The feed ports to a first cylinder are shown as the circular port openings 178 provided in the outer arcuate section 180. The feed ports to the other cylinder of the pair of cylinders fed by a single chute, are shown as the elongated openings 182 formed in the inner arcuate circle 184. Since the arcuate outer section 180 is longer than the arcuate inner section 184, the size of the circular ports 178 in the outer section will be larger than if circles were made in the inner arcuate section. Accordingly, if a circular arrangement were used in both the outer and inner arcuate sections, the outer would receive more fuel than the inner. Accordingly, in the inner section, the ports are made oblong so that their total area equals the circular area in the outer section. In this way, both the cylinder fed from the outer arcuate sections, as well as the cylinder fed from the inner arcuate section will both receive the same amount of fuel from the common chute.

Other portions of the engine are substantially standard with conventional internal combustion engines. For example, a distributor 190 is included, as shown in FIG. 1. Similarly, an oil pump 192 is provided as shown in FIG. 2 as is provided the timing chain 194. Gearing, pumps, etc. will also be provided as in a standard internal combustion engine.

In operation, a supply of gunpowder would be provided in a storage tank in the vehicle. The gunpowder would be pumped into the storage chamber in the upper housing above the cylinder blocks. Air would be sucked into the upper chamber. By operation of the throttle, a supply of gunpowder would be brought into the chutes and by means of the drums would be rotated along the bifurcated tubes. At the appropriate time controlled by the camming mechanism, the drum is rotated and the fuel injection means would ram the metered amount of fuel and air mixture into the cylinder head. Also, at the appropriate time, the cam mechanism would operate the intake valve to bring in a supply of cold air to the cylinders. The spark plug would fire and the gunpowder would burn within the cylinder. The piston would be moved downward to drive the crank shaft thereby turning the engine. The exhaust stroke of the piston would force the burned gunpowder out of the cylinders and would be exhausted. The main crank shaft would drive the vehicle and the transverse crank shaft is utilized for controlling the rotating block which controls the cam mechanism, the crank arm driving the drums and injection means, as well as the S-cam controlling the idle tubes.

There has been described heretofore the best embodiment of the invention presently contemplated. However, it is to be understood that various changes and modifications may thereto without departing from the spirit of the invention.

I claim:

1. A gunpowder fueled internal combustion engine, comprising:
   a cylinder block;
   a plurality of cylinders arranged in the cylinder block;
   an upper housing on the cylinder block;
   a storage chamber located in the upper housing for storing gunpowder;
   an air intake system in said upper housing;
   a metering system for sequentially directing controlled amounts of gunpowder and air from said upper housing to each cylinder, wherein the gunpowder and air mixture can be burned;
   crank shaft means in said cylinder block;
   a corresponding piston reciprocatingly associated with each cylinder and drivingly coupled to said crank shaft means;
   said metering system comprising a series of gunpowder chutes having their mouths arcuately spaced apart about the lower portion of said storage chamber for receiving gunpowder therein from said storage chamber, a butterfly throttle valve positioned downstream along each of said chutes for controlling the amount of gunpowder passing along the chutes, a drum positioned transversely across each chute downstream of the throttle valve, a helical groove formed about each drum, each of said drums being driven by a crank arm extending from a cam shaft which is in turn driven by said crank shaft means, and a gunpowder injection means located further downstream along each chute and adjacent each cylinder for forcing a controlled amount of gunpowder into its respective cylinder, said gunpowder injection means also being driven by said crank arm.

2. An internal combustion engine as in claim 1, wherein the lower end of each gunpowder chute is bifurcated such that each chute is associated with a pair of cylinders and further comprising a first series of adjacent elongated ports arcuately spaced about an inner circular section for feeding one cylinder of each of said pairs of cylinders, a corresponding second series of adjacent circular ports arcuately spaced about a corresponding outer circular section for feeding the other cylinder of said pair of cylinders, whereby the total amount of port area of said two series is substantially equal such that both cylinders of each pair receive substantially the same amount of gunpowder.

3. An internal combustion engine as in claim 1 and further comprising a choke section coupled between said intake system and each of said chutes to provide a mixture of air into the gunpowder.

4. An internal combustion engine as in claim 1, and further comprising a rotating plate operated by said crank shaft means, an S-cam axially extending from said rotating plate, a series of idle tubes each having two inlet ports and an outlet port, one of each of the inlet ports being coupled to said storage chamber for receiving a supply of gunpowder, the other of each of said inlet ports coupled to said air intake means for receiving air, each outlet port coupled to a respective chute upstream of said drums, a spring valve positioned along each idle tube and engaged by said S-cam for supplying a limited amount of gunpowder and air to the cylinders when the engine is idling, and adjustable control means associated with the gunpowder inlet ports of the idle tubes for setting said limited amount of gunpowder.

* * * * *